United States Patent
Malgouyres et al.

(10) Patent No.: US 8,798,365 B2
(45) Date of Patent: Aug. 5, 2014

(54) METHOD FOR SEGMENTING IMAGES, COMPUTER PROGRAM, AND CORRESPONDING COMPUTER SYSTEM

(75) Inventors: François Malgouyres, La Garenne-Colombes (FR); Nicolas Lerme, Villiers-le-Bel (FR); Lucas Letocart, Enghien-les-Bains (FR)

(73) Assignee: Universite Paris 13, Villetaneuse (FR)

( * ) Notice: Subject to any disclaimer, the term of this patent is extended or adjusted under 35 U.S.C. 154(b) by 99 days.

(21) Appl. No.: 13/574,399

(22) PCT Filed: Jan. 21, 2011

(86) PCT No.: PCT/FR2011/000041
§ 371 (c)(1),
(2), (4) Date: Oct. 23, 2012

(87) PCT Pub. No.: WO2011/089341
PCT Pub. Date: Jul. 28, 2011

(65) Prior Publication Data
US 2013/0058574 A1    Mar. 7, 2013

(30) Foreign Application Priority Data

Jan. 21, 2010  (FR) .................................... 10 50407

(51) Int. Cl.
*G06K 9/34* (2006.01)
*G06K 9/00* (2006.01)
*G06K 9/46* (2006.01)

(52) U.S. Cl.
CPC .......... *G06K 9/00463* (2013.01); *G06K 9/4638* (2013.01)
USPC ........................................................ 382/173

(58) Field of Classification Search
USPC ........................................................ 382/173
See application file for complete search history.

(56) References Cited

U.S. PATENT DOCUMENTS 8,478,044 B2 *   7/2013  Grady et al. .................. 382/173
2008/0136820 A1 *   6/2008  Yang et al. .................... 345/440

* cited by examiner

*Primary Examiner* — Yon Couso
(74) *Attorney, Agent, or Firm* — Young & Thompson

(57) ABSTRACT

An image segmenting method includes: reading (202) an image, determining (232) a solution to the problem of maximum flow in a graph including, on the one hand, as vertices, a source, a sink and image points, with each point being assigned a capacity, called a through-capacity, assigning (234), on the basis of the determined solution, a label to each of at least some of the points of the image, and recording the image with the assigned labels in a computer memory. In addition, before determining a solution to the problem of maximum flow, the method includes: determining (212) critical points, for each of which, the points of the image located in a predetermined window applied around the critical point verify a predetermined condition on their through-capacities. The points of the graph include the determined critical points and the inter-point arcs link the neighboring critical points to one another.

13 Claims, 5 Drawing Sheets

METHOD FOR SEGMENTING IMAGES, COMPUTER PROGRAM, AND CORRESPONDING COMPUTER SYSTEM

The present invention relates to an image segmenting method, a corresponding computer program and a corresponding computer system.

The invention applies more specifically to the field of computer vision.

The following terminology is used in the present description, as well as in the claims.

An "computer system" is a system designed to run computer program instructions and, to this end, comprising at least one central processing unit, also called a processor or a CPU. In order of increasing complexity, a computer system according to the invention may consist of a single computer comprising one or more CPU(s), or a more complex assembly in which a plurality of computers are interconnected via a data transmission network.

A "computer memory" means any type of medium on which data capable of being read by a computer is recorded. This term covers in particular floppy disks, compact disks or DVDs. This term also covers systems combining the actual computer memory and the devices for reading and/or writing on the latter, such as RAM memory, hard disks or USB flash drives.

A "computer program", or more simply a "program", is a set of instructions intended to be run by one or more processors of a computer system.

The article of Y. Boykov and M-P. Jolly: "Interactive graph cuts for optimal boundary and region segmentation of objects in n-d images", ICCV01: Proceedings of "International Conference on Computer Vision", pages 105-112, 2001, describes an image processing method comprising steps of:
reading an image recorded in a computer memory, wherein the image comprises a plurality of points, each having a position in the image,
determining a solution to the problem of maximum flow in a graph comprising, on the one hand, as vertices, a source, a sink and image points, and, on the other hand, arcs each having a positive or zero flow passage capacity,
wherein the arcs include arcs called source arcs, linking the source to each of the points, arcs called sink arcs, linking the sink to each of the points, and arcs called inter-point arcs, linking the points to one another,
wherein each point is assigned a capacity, called a through-capacity, representing the combination of the flow passage capacities of the source arc and the sink arc linking it respectively to the source and to the sink,
assigning, on the basis of the determined solution, an "object" label or a "background" label to each of at least some of the points of the image,
recording the image with the assigned labels in a computer memory.

In this document, the image is two-dimensional with its points regularly spaced apart in the two dimensions and distributed over rows and columns.

In addition, the label of certain image points, called seeds, is assigned by the user or determined by the computer.

The vertices of the graph are constituted by all of the image points and the arcs of the graph link each point with its neighboring points, according to the so-called "type-0" neighboring criterion. This criterion defines, in two dimensions, the neighboring points of a point considered, as the four points positioned respectively directly above, directly below, directly to the left and directly to the right of the point considered.

A capacity, called an inter-point capacity, is assigned to each of these arcs. The inter-point capacity is determined on the basis of the intensities of the two neighboring points linked by the arc.

In addition, a through-capacity is assigned to each image point. This through-capacity is determined differently depending on whether the point is a seed point or an unknown label point. In the latter case, the through-capacity is determined on the basis of the intensity of the point.

The problem of maximum flow, known in itself, consists of determining the maximum "flow" capable of flowing from a source to a sink, both linked to each point of the graph, complying, in the graph, with the inter-point capacities and, across the graph, with the through-capacities.

A number of algorithms are available for solving this problem, such as that presented in the article of Y. Boykov and V. Kolmogorov: "An experimental comparison of min-cut/max flow algorithms for energy minimization in vision", EMMCVPR01 Proceedings of the International Workshop on Energy Minimization Methods in Computer Vision and Pattern Recognition, pages 359-374, 2001.

It is empirically observed that this algorithm requires an amount of computer memory and a calculation time that increase linearly as a function of the number of vertices and arcs in the graph.

Thus, the known segmenting methods present the problem of requiring large amounts of computer memory and computer calculation time, when the size of the image, i.e. the number of points that it has, increases.

It may thus be desirable to provide an image segmenting method that enables the aforementioned problems and constraints to be at least partially overcome.

The invention therefore relates to an image segmenting method, comprising steps of:
reading an image recorded in a computer memory, wherein the image comprises a plurality of points, each having a position in the image,
determining a solution to the problem of maximum flow in a graph comprising, on the one hand, as vertices, a source, a sink and image points, and, on the other hand, arcs each having a positive or zero flow passage capacity,
wherein the arcs include arcs called source arcs, linking the source to each of the points, arcs called sink arcs, linking the sink to each of the points, and arcs called inter-point arcs, linking the points to one another,
wherein each point is assigned a capacity, called a through-capacity, representing the combination of the flow passage capacities of the source arc and the sink arc linking it respectively to the source and to the sink,
assigning, on the basis of the determined solution, an "object" label or a "background" label to each of at least some of the points of the image,
recording the image with the assigned labels in a computer memory,
characterized in that it comprises, before determining a solution to the problem of maximum flow:
determining points of the image, called critical points, for each of which the image points located in a predetermined window applied around the critical point verify a predetermined condition on their through-capacities,
and in that the points of the graph include the determined critical points and the inter-point arcs linking the neighboring critical points to one another according to a predetermined neighboring criterion on their relative positions in the image.

Indeed, it has been found that, most of the time, the solution to the problem of maximum flow on all of the points of the image gave a non-zero flow in the source arc or in the sink arc for each of only a small number of points. It was also found that it was possible to determine all of these points, or at least a large portion of these points, in advance (i.e. before solving the problem of maximum flow), on the basis of the through-capacities. More specifically, it was found that a point had a good chance of having a non-zero flow in its source arc or its sink arc if the points of the image located in a predetermined window applied around the critical point verified a predetermined condition on their through-capacities. Thus, in the best of cases, the critical points found correspond exactly to the points that would have had a non-zero flow in the source arc or in the sink arc with a solution of the maximum flow on all of the points of the image. Of course, it is possible, depending on the condition chosen, for the critical points not to correspond exactly with these points: some might have a zero through-flow while solving the problem of maximum flow on all of the points of the image, and, conversely, some points that would have had a non-zero through-flow by solving the problem of maximum flow on all of the points of the image may not be determined to be a critical point.

Owing to the invention, the problem of maximum flow is solved only for some points of the image (the critical points), which in general represent only a small portion of all of the points of the image. Thus, the amount of computer memory and the computer calculation time necessary for segmentation are reduced.

In addition, it has been observed that the solution to the problem of maximum flow at only the critical points gives very good segmenting results, close to the solution that would have been obtained by taking into account all of the points of the image.

Optionally, all of the points of the image verifying the predetermined condition are determined.

Also optionally, the window is centered over the point to which it is applied.

Also optionally, each point has an intensity, the through-capacity of each of at least some of the points is determined on the basis of the intensity of this point, and the flow passage capacity of each of at least some of the inter-point arcs is determined on the basis of the intensity of the two points that it links.

Also optionally, the predetermined condition is that, among at least a predetermined number of points of the image located in a predetermined window applied around the critical point:
   at least two points have through-capacities of opposite signs,
   at least one point has a positive through-capacity that is less than a predetermined positive threshold, or
   at least one point has a negative through-capacity that is greater than a predetermined negative threshold.

Indeed, with well-chosen capacity thresholds (i.e. relatively large in absolute value), a point that is not critical means that the maximum flow quantity capable of entering (or leaving, respectively) the window around this point, and without considering this point, is greater than the maximum flow quantity capable of leaving (or entering, respectively). There is therefore a high probability that the points of the window around the point considered are enough to saturate the inter-point arcs of the periphery of the window, and therefore that the maximum flow solution would give a zero flow from the source (or the sink, respectively) to this point, i.e. this point is not involved in the maximum flow found. Experimentally, it has been found that, with certain threshold values, identical solutions between the method of the invention and the method with all of the points of the image were obtained. It has also been observed that the segmentation changes as the absolute values of the thresholds decrease.

Also optionally, the thresholds are constant in the window.

Also optionally, the method comprises, in order to determine the critical points: examining the points of the image, and, for each point examined, called a point in progress: determining whether the through-capacities for at least a predetermined number of windowed points of the point in progress are each greater than the predetermined positive capacity threshold, or whether their through-capacities are each less than the predetermined negative capacity threshold, by examining all of the windowed points in order to compare their through-capacity with the negative threshold and the positive threshold.

Also optionally, the method also comprises, in order to determine the critical points: examining the points of the image, and, for each point examined, called a point in progress: determining whether the through-capacities for all of the windowed points of the point in progress are each greater than the predetermined positive capacity threshold, or whether their through-capacities are each less than the predetermined negative capacity threshold, by using the determination obtained for a point examined before the point in progress.

The invention also relates to a computer program capable of being downloaded from a communication network and/or recorded on a medium capable of being read by a computer, characterized in that it includes computer program instructions for implementing an image segmenting method of the invention when said computer program is run by a computer.

The invention also relates to an information system comprising:
   a device for reading a computer memory,
   a device for writing in a computer memory,
   characterized in that it comprises:
   a computer memory in which a computer program is recorded, including computer program instructions for, when the computer program is run by the computer system:
      reading, by means of the reading device, an image recorded in a computer memory, wherein the image comprises a plurality of points, each including a position in the image,
      assigning a capacity to each point, called a through-capacity,
      determining points of the image, called critical points, for each of which, the points of the image located in a predetermined window applied around the critical point verify a predetermined condition on their through-capacities,
      determining a solution to the problem of maximum flow in a graph comprising, on the one hand, as vertices, a source, a sink and determined image points, and, on the other hand, arcs each having a positive or zero flow passage capacity,
      wherein the arcs include arcs called source arcs, linking the source to each of the points, arcs called sink arcs, linking the sink to each of the points, and arcs called inter-point arcs, linking the neighboring critical points to one another according to a predetermined neighboring criterion on their relative positions in the image,
      wherein the through-capacities represent the combination of the flow passage capacities of the source ark and the sink arc linking it respectively to the source and to the sink, assigning, on the basis of the determined solution, an "object" label or a "background" label to each of at least some of the points of the image, recording, by means of the writing device, the image with the assigned labels in a computer memory.

In particular, the computer system of the invention may be a medical imaging machine, such as a resonance imaging machine (or MRI), a scanner, and so on.

The invention will be easier to understand in view of the following description, provided solely by way of an example and in reference to the appended drawings, in which.

Figure 1:
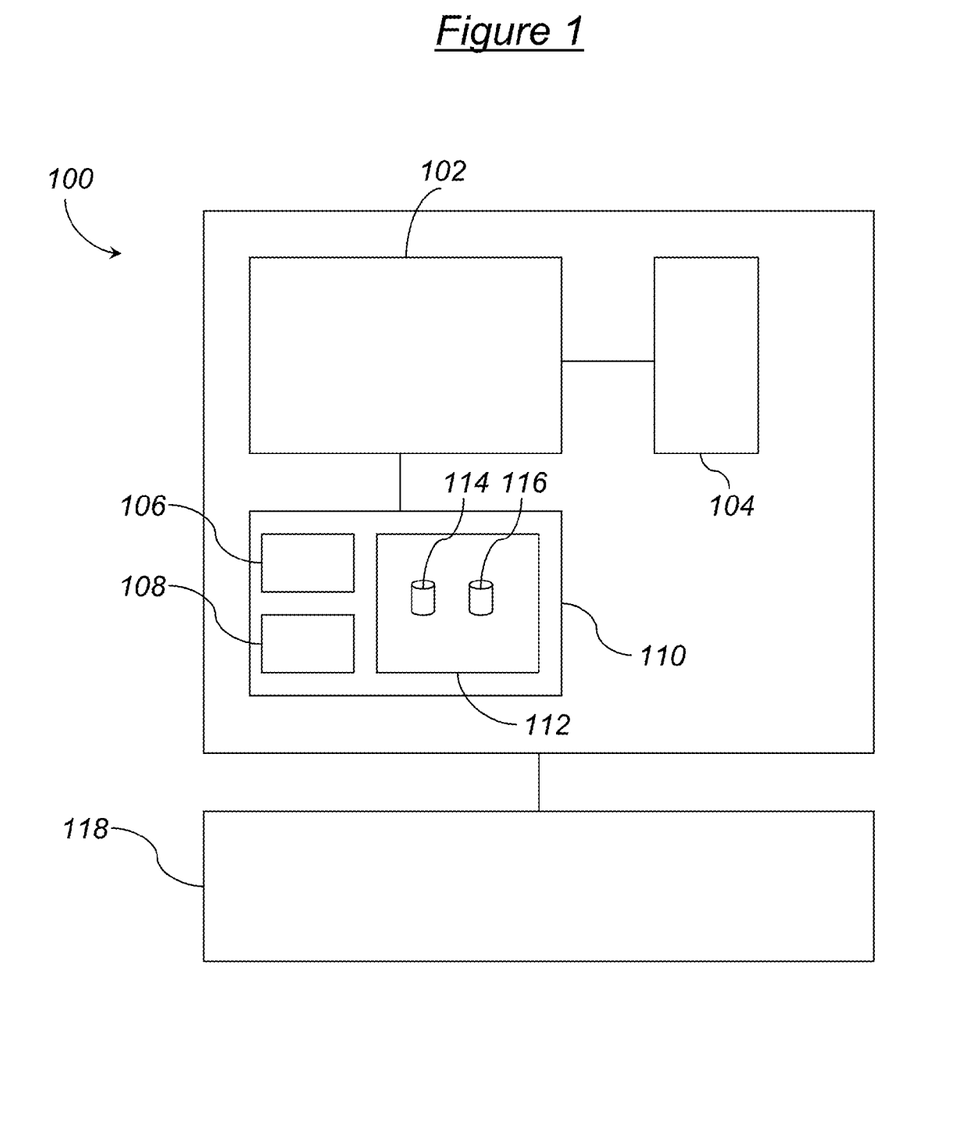
FIG. 1 shows an example of a computer system according to the invention.

In reference to FIG. 1, an example of a computer system according to the invention is shown, in the form of a computer 100.

The computer 100 comprises, first, a CPU 102 and RAM memory 104, capable of running computer program in order, in particular, to control the other elements of the computer 100.

Among these other elements, the computer 100 comprises, first, a device for reading 106 a computer memory and a device for writing 108 in a computer memory. For example, these two devices 106, 108 correspond to a hard disk of the computer, or, respectively, to a compact disk or DVD reader and to a hard disk. In the remainder of the description, we will consider the case of a hard disk, referenced 110, so that the two devices 106, 108 access the same computer memory, referenced 112. An image 114 is recorded in the computer memory 112 of the hard disk 110. This image comes, for example, from a medical imaging machine, such as a nuclear magnetic resonance imaging machine (or nMRI), a scanner, and so on.

The computer 100 also comprises a computer memory in which a computer program 116 is recorded. In the remainder of the description, the program 116 will be considered to be recorded in the computer memory 112 of the hard disk 110.

The computer 100 also comprises a human/machine interface 118, such as the combination of a screen, a keyboard and/or a mouse.

The image 114 comprises a plurality of points, each including a position in the image and an intensity. The intensity may comprise a single value, representing, for example, a gray level, or a plurality of values, representing, for example, a color, for example expressed in RGB (Red, Green, Blue) form or the values of a plurality of channels in the case of a multichannel image. In the remainder of the description, we will consider the case of a two-dimensional square image, in which the points are regularly spaced apart according to the two dimensions, and organized in rows and columns. All of the points are noted P.

The program 116 includes computer program instructions for, when this program 116 is run by the computer system 100, implementing the image segmenting method, which will now be described.

Figure 2:
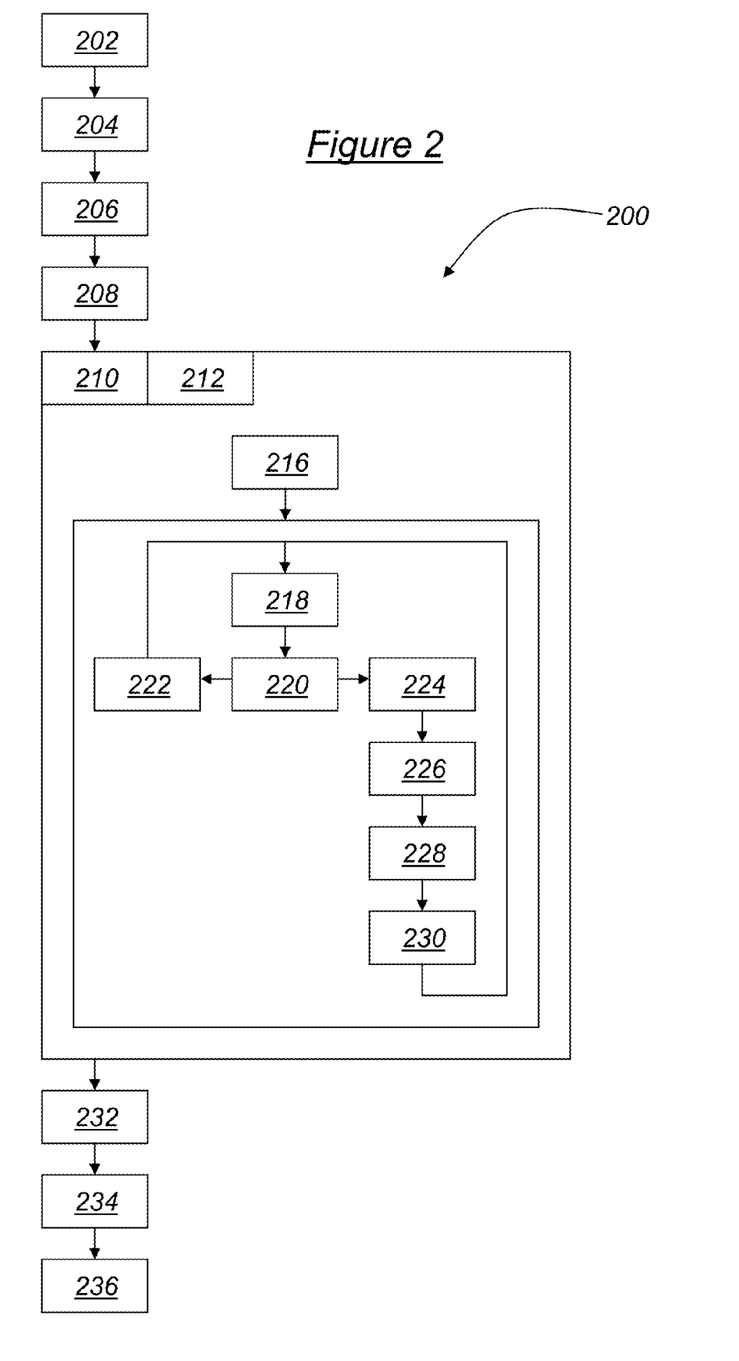
FIG. 2 shows the steps of an image segmenting method implemented by the computer system of FIG. 1.

In reference to FIG. 2, the image segmenting method 200 comprises the following steps.

After, for example, the program 116 has been started by a user, in a step 202, the computer 100 reads, by means of the reading device 106, the image 114 recorded in the computer memory 112 of the hard disk 110.

In a step 204, the computer 100 will assign an "object" or "background" label to certain points, called "seed points". These labels are, for example, indicated by the user via the human/machine interface 118, or are determined by the computer 100 by means of an ad hoc method enabling the seed points to be generated automatically.

In a step 206, the computer 100 determines a capacity, called a through-capacity, for each point of the image. The through-capacity of a point p∈P is noted c(p). For the points that are not seed points, this through-capacity is, for example, determined on the basis of the intensity of the point alone, without using the intensity of other points.

In a step 208, the computer 100 assigns, to each point p∈P, its through-capacity c(p).

In a step 210, the computer 100 determines points of the image, called critical points.

A point of the image is a critical point when at least a predetermined number of points of the image located in a predetermined window applied around this point verify a predetermined condition on their through-capacities.

The points of the image located in the predetermined window applied around a point p∈P are called window points of this point p and are noted Z(p). It should be noted that the point p around which the window is applied, is itself a windowed point.

The fact of not considering all of the windowed points may be beneficial, for example, when it is desirable to move away from the windowed points those of which the intensity is determined to be aberrant. Preferably, however, a point of the image is a critical point when all of the points of the image located in a predetermined window applied around this point verify the predetermined condition on their through-capacities. It is the latter case that will be considered in the remainder of the description.

Preferably, the condition is that, among the windowed points of the point:

at least two windowed points have through-capacities of opposite signs, at least one windowed point has a positive through-capacity that is less than a predetermined positive threshold, called a positive capacity threshold, or at least one windowed point has a negative through-capacity that is greater than a predetermined negative threshold, called a negative capacity threshold.

Thus, in other words, a point of the image is not a critical point when the through-capacities of all of the windowed points of this point:

are each greater than the predetermined positive capacity threshold, or are each less than the predetermined negative capacity threshold.

Preferably, the window has a fixed size. Also preferably, the window is centered over the point to which it is applied. Also preferably, the window is rectangular, for example square. Throughout the description, the window is considered to have a fixed size, to be centered and to be square.

In addition, preferably, the capacity thresholds are equal in absolute value. Preferably, the capacity thresholds are constant, i.e. independent of the position of the point in the window, as well as the point to which the window is applied.

In the remainder of the description, the capacity thresholds are considered to be equal in absolute value and constant. They are respectively noted δ and −δ (δ being strictly positive).

Thus, a point of the image is a critical point when it does not verify the following condition, noted (C):

$$\begin{cases} c(q) \geq \delta, \forall q \in Z(p) \\ \text{or} \\ c(q) \leq -\delta, \forall q \in Z(p) \end{cases}$$

Preferably, all of the points of the image verifying the predetermined condition are determined in step 210. The set of critical points is hereinafter noted $P_c$.

In a step 212, the computer 100 determines, for each critical point $p \in P_c$, its neighboring points, noted N(p), according to a predetermined neighboring criterion on their relative positions in the image 114. In the example described, the neighboring criterion is the so-called type-0 neighboring criterion. This criterion defines, in two dimensions, the neighboring points of a point considered as the four points positioned respectively directly above, directly below, directly to the left and directly to the right of the point considered. In general, for an image of dimension d, the type-0 neighboring criterion is as follows:

$$N(p) = \left\{ q \in P: \sum_{i=1}^{d} |q_i - p_i| = 1 \right\}, \forall p \in P.$$

In a step 212, the computer 100 assigns, to each pair of neighboring critical points, a capacity, called in inter-point capacity. The inter-point capacity of two neighboring critical points $p \in P_c$ and $q \in P_c$ is noted c(p, q). This inter-point capacity is, for example, determined on the basis of the intensities of the two points alone, without using the intensity of other points.

For example, steps 210 and 212 are implemented at the same time by the next steps 216 to 222.

Figure 3:
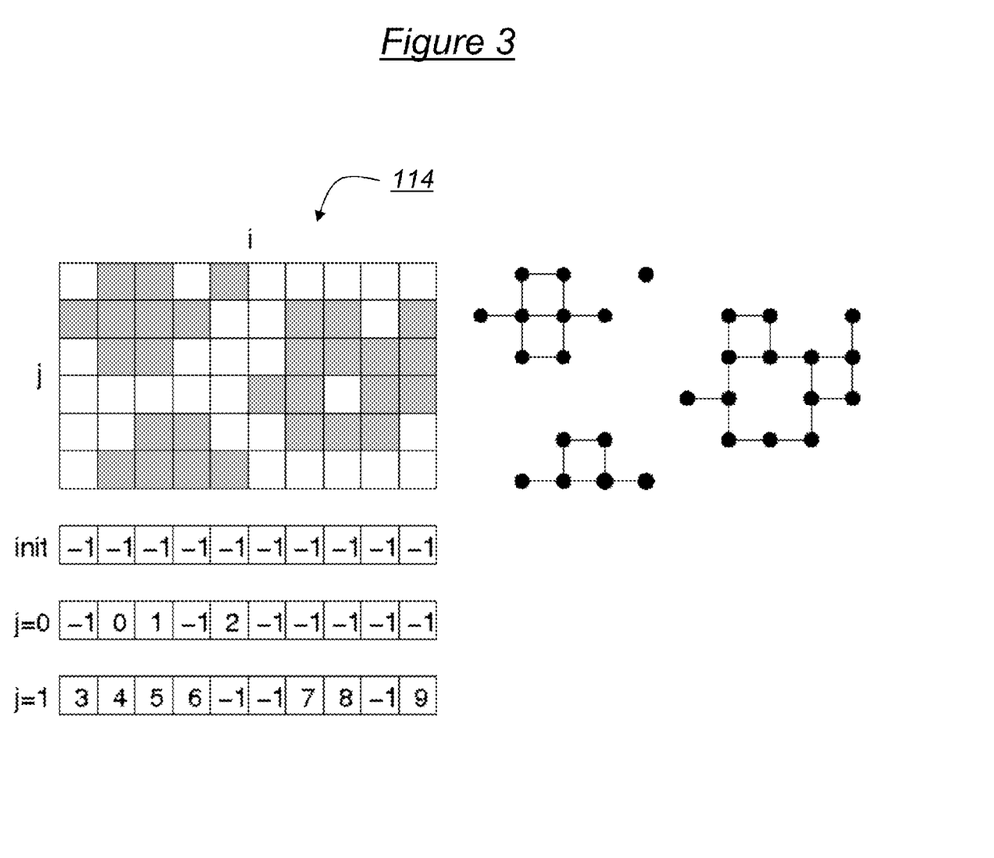
FIG. 3 shows an example of the performance of some of the method of FIG. 2.

In reference to FIGS. 2 and 3, in a step 216, the computer 100 resets all of the elements of a list of size N (N being the side of the image), noted L, to the value −1, and sets a counter, noted cpt, to the value 0.

The computer 100 then examines the points of the image, preferably all of them, going row-by-row, from one point to the next. For each point examined, called point in progress, the computer 100 implements next steps 218 to 230.

In a step 218, the computer 100 determines whether the condition (C) is verified for the point in progress.

For this, in a step 220, the computer 100 examines all of the windowed points of the point in progress in order to compare their through-capacity with each of the capacity thresholds.

If condition (C) is verified, in a step 222, the computer 100 will record the value −1 in the element L[i], i being the column number of the point in progress.

If condition (C) is not verified, the computer 100 implements the next steps.

In a step 224, the computer 100 identifies the point in progress as being the critical point.

In a step 226, the computer 100 identifies the point in progress and its neighboring point located directly above as two adjacent critical points if the element L[i] has a value greater than or equal to zero. The computer 100 then creates, always during this step, an arc between these two neighboring critical points, then determines and associates an inter-point capacity with this arc.

In step 228, the computer 100 identifies the point in progress and its neighboring point located directly to the left as two neighboring critical points if the element L[i−1] has a value greater than or equal to zero. The computer 100 then creates, still during this step, an arc between these two neighboring critical points, then determines and associates an inter-point capacity with this arc.

In a step 230, the computer 100 records the value of the counter cpt in the element L[i] of the list, then increments the counter cpt by 1.

Thus, after steps 210 and 212, the computer 100 has determined all of the critical points of the image, as well as the pairs of neighboring critical points.

In a step 232, the computer 100 determines a solution to the problem of maximum flow in a graph comprising, on the one hand, as vertices, a source, a sink and the determined image points, and, on the other hand, arcs each having a positive or zero flow passage capacity. These arcs include arcs called source arcs, linking the source to each of the critical points, arcs called sink arcs, linking the sink to each of the points, and arcs called inter-point arcs, linking the points to one another. In this graph, the through-capacities represent the combination of the flow passage capacities of the source arc and the sink arc linking it respectively to the source and to the sink. More specifically, the through-capacity of a point $p \in P$ is equal to the difference in the flow passage capacities of the sink arc linking this point:

$$c(p) = c_{source}(p) - c_{sink}(p)$$

As shown in the article of V. Kolmogorov and R. Zabih "What energy functions can be minimized via graph cuts?" published in ECCV02: Proceedings of the European Conference on Computer Vision, pages 65-81, 2002, these two ways of seeing the through-flows are equivalent. Thus, in the sense of the invention, the term "through-capacity" means both the value c(p) and the set of two values $c_{source}(p)$ and $c_{sink}(p)$.

The solution to this problem is obtained, for example, by using known methods, as described in the document cited above.

In a step 234, the computer 100 assigns, according to the solution determined, an "object" label or a "background" label to each of at least some of the points of the image, and preferably all of the points of the image.

In a step 236, the computer 100 records, in the computer memory 112 of the hard disk 110, by means of the writing device 108, the image 114 with the assigned labels.

In the method of FIG. 2, the step 218 requires all of the windowed points to be examined, resulting in a high calculation cost, proportional to the size of the window. However, it may be beneficial to use a large window, because it has been found that this enabled the capacity thresholds to be reduced significantly, in absolute value, and therefore the number of critical points to be further reduced.

Figure 4:
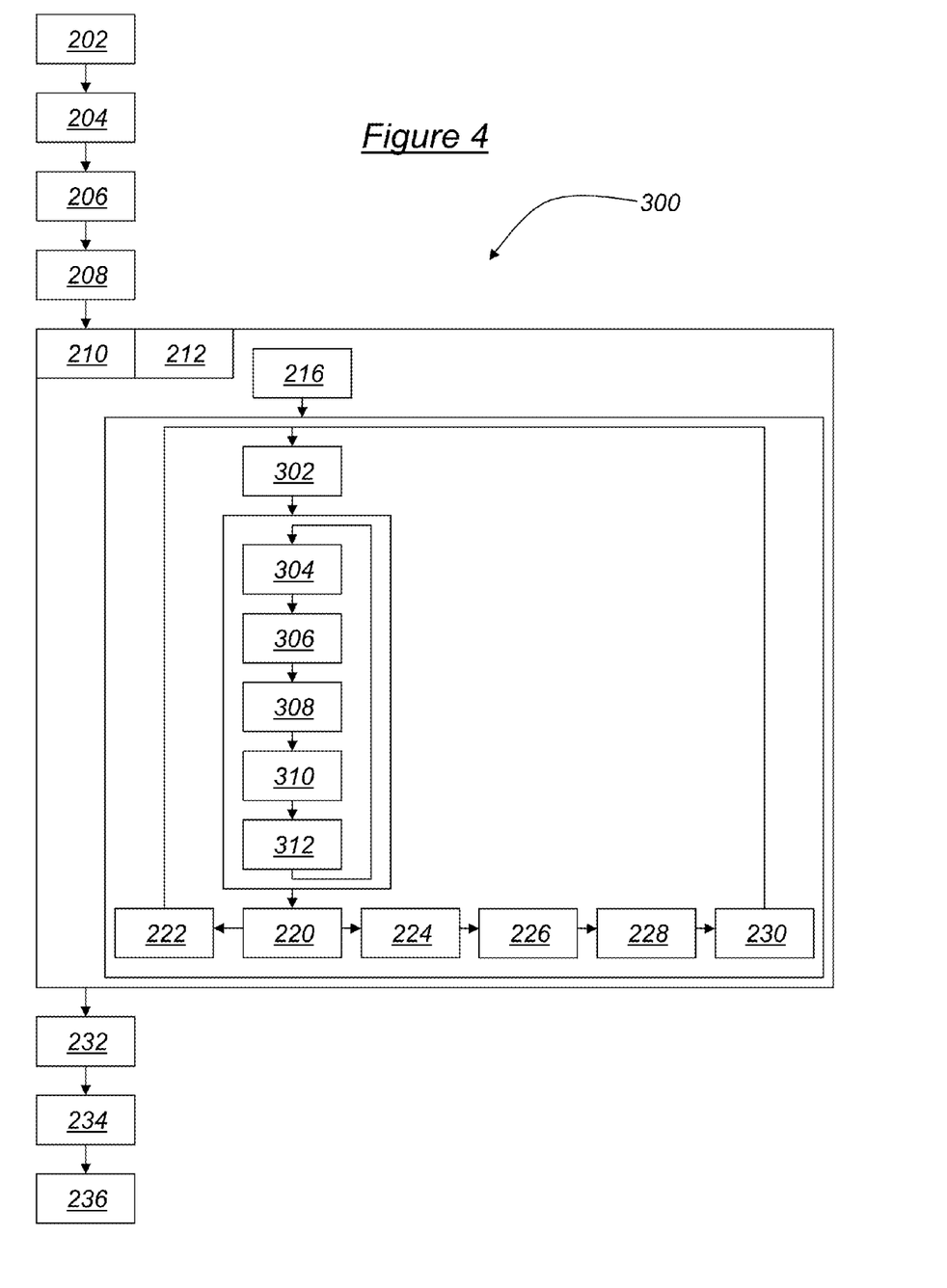
FIG. 4 shows the steps of an alternative of the segmenting method of FIG. 2.
Figure 5:
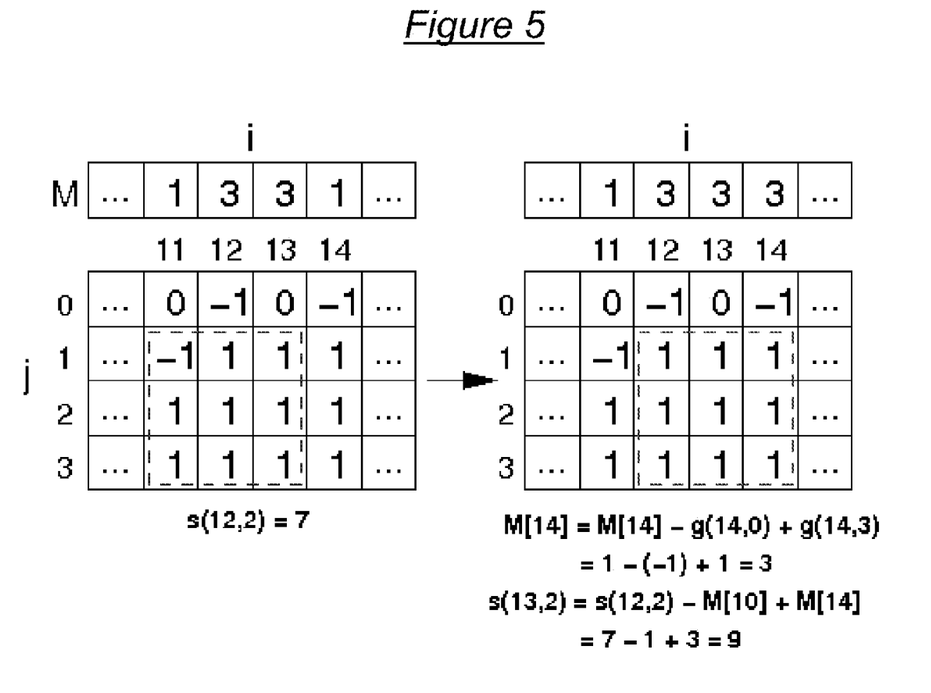
FIG. 5 shows an example of the performance of some of the method of FIG. 4.

In reference to FIGS. 4 and 5, the method 300 overcomes this problem.

The method 300 is identical to the method 200 of FIG. 2, except that step 218 is replaced by the next steps 302 to 312, and, in the example described, the window is of an uneven number.

In a step 302, the computer 100 determines whether the condition (C) is verified for the point in progress, using the determination obtained for at least one point examined before the point in progress. This indeed makes it possible to take advantage of the comparisons with the positive and negative thresholds, which were previously produced.

Preferably, it is the next-to-last point that is used, i.e. that examined just before the point in progress. Indeed, in any case at a distance from the edges of the image, when going from one point to the next in a row, only one windowed point has not been tested with respect to the capacity thresholds.

Thus, in a step 304, the computer 100 determines at least one windowed point, called the remaining windowed point, of which the through-capacity has not yet been compared with the capacity thresholds.

In a step 306, the computer 100 compares the through-capacity of each remaining windowed point with the capacity thresholds.

In a step 308, the computer 100 assigns, to each remaining windowed point, a first test value when its through-capacity is greater than the predetermined positive threshold, a second test value when its through-capacity is less than the predetermined negative threshold, or a third test value in the other cases, with this third value being between the first and second test values and different from them.

For example, the first, second and third test values are, respectively, 1, −1 and 0. In this case, the test value of a remaining windowed point p∈P, noted $g_\delta(p)$, is given by:

$$g_\delta(p) = \begin{cases} 1 & \text{if } c(p) \geq \delta \\ -1 & \text{if } c(p) \leq -\delta \\ 0 & \text{if not} \end{cases}$$

In a step 310, the computer 100 determines the sum of the test values of the windowed points of the point in progress, called the sum in progress and noted s(i, j), with i and j respectively being the column and row numbers of the point in progress. The sum in progress is determined on the basis of the sum of the test values of the windowed points of the point previously examined in the row, noted s(i−1, j), the test value of the remaining windowed point, and windowed points of the next-to-last point no longer appearing among the windowed points of the point in progress. The sum in progress is, for example, calculated by ((k−1)/2 being noted $\overline{k/2}$):

$s(i,j)=s(i-1,j)-M[i-\overline{k/2}-1]+M[i+\overline{k/2}]$ with $M[i+\overline{k/2}]=M[i+\overline{k/2}]-g_\delta(i+\overline{k/2},j-\overline{k/2}-1)+g_\delta(i+\overline{k/2},j+\overline{k/2})$ In a step 312, the computer 100 determines whether the condition (C) is verified for the point in progress, and therefore whether the point in progress is a critical point, based on the sum in progress s(i, j). In the example described, the point in progress is identified as being a critical point if |s (i, j)|≠k².

Steps 304 to 312 are repeated for each point examined, being adapted in the case of points close to the edges of the image.

The method of FIG. 4 therefore makes it possible to overcome the problem of window size, so that the cost becomes almost constant according to the window size.

It appears to be clear that the invention makes it possible to reduce the number of points of the graph for which the problem of maximum flow is solved, and, therefore, the calculation and computer memory costs of the segmenting method.

It should also be noted that the invention is not limited to the embodiments described above. It will indeed be apparent to a person skilled in the art that various modifications can be made to the embodiment described above, in light of the teaching presently disclosed.

First, the image is not limited to two dimensions. The image may, for example, be three-dimensional (volume) or four dimensional (generally representing a volume over time), or even more. The methods presented above can easily be adapted to these cases.

In addition, the neighboring criterion may be chosen differently, for example, as the type-1 neighboring criterion, in which the neighbors of a point are defined by:

$N(p)=\{q\in P: |q_i-p_i|\leq 1, \forall 1\leq i\leq d\}, \forall p\in P.$

Again, the methods presented above can easily be adapted. It is noted that, with this kind of neighboring, the method of FIG. 2 requires a list of size N+1, instead of N, so that the computer memory cost is identical.

In addition, it is possible to provide a window of which the size varies according to the image point to which it is applied.

In addition, the invention also covers the case in which the capacity thresholds vary according to the position of the point in the window. For example, it may be advantageous to provide capacity thresholds with a higher absolute value at the periphery of the window, since it is the windowed points of the periphery of the window that have the highest probability of contributing the most to the saturation of inter-point arcs of the periphery of the window. However, in this case, there would in principle be fewer points determined as being critical points, and the solving of the maximum flow problem would risk to be done on a larger graph.

In addition, in other embodiments, the image may be read and recorded using computer memories of other types than a hard disk memory.

For example, the image may be read from the random access memory of the computer, or from a memory of an information device outside the computer, such as a medical imaging machine (MRI, scanner, etc.), via a data communication network.

For example, the image with its labels may be recorded in the random access memory of the computer by means of corresponding writing devices. Thus, the image may be read quickly in order, for example, to perform other processing operations, for example, in order to determine the volume of the segmented object.

In the claims below, the terms used should not be interpreted as limiting the claims to the embodiment described in this description, but should be interpreted so as to include all of the equivalents that the claims are intended to cover, in their wording and that can be envisaged by a person skilled in the art applying his or her general knowledge to the implementation of the teaching disclosed above.

The invention claimed is:

1. Image segmenting method, comprising:
   a computer system reading an image recorded in a computer memory, wherein the image comprises a plurality of points, each having a position in the image,
   a computer system determining a solution to the problem of maximum flow in a graph comprising, on the one hand, as vertices, a source, a sink and image points, and, on the other hand, arcs each having a positive or zero flow passage capacity, wherein the arcs include arcs called source arcs, linking the source to each of the points, arcs called sink arcs, linking the sink to each of the points, and arcs called inter-point arcs, linking the points to one another,
   wherein each point is assigned a capacity, called a through-capacity, representing the combination of the flow passage capacities of the source arc and the sink arc linking it respectively to the source and to the sink,
   a computer system assigning, on the basis of the determined solution, an "object" label or a "background" label to each of at least some of the points of the image,
   a computer system recording the image with the assigned labels in a computer memory, characterized in that it comprises, before determining a solution to the problem of maximum flow:
a computer system determining points of the image, called critical points, for each of which the image points located in a predetermined window applied around the critical point verify a predetermined condition on their through-capacities,
and in that the points of the graph include the determined critical points and the inter-point arcs linking the neighboring critical points to one another according to a predetermined neighboring criterion on their relative positions in the image.

2. Image segmenting method according to claim 1, wherein all of the points of the image verifying the predetermined condition are determined.

3. Image segmenting method according to claim 1, wherein the window is centered on the point to which it is applied.

4. Image segmenting method according to claim 1, wherein:
each point has an intensity,
the through-capacity of each of at least some of the points is determined on the basis of the intensity of this point, and
the flow passage capacity of each of at least some of the inter-point arcs is determined on the basis of the intensity of the two points that it links.

5. Image segmenting method according to claim 1, wherein the predetermined condition is that, among at least a predetermined number of points of the image located in a predetermined window applied around the critical point:
at least two points have through-capacities of opposite signs,
at least one point has a positive through-capacity that is less than a predetermined positive threshold, or
at least one point has a negative through-capacity that is greater than a predetermined negative threshold.

6. Image segmenting method according to claim 5, in which the thresholds are constant in the window.

7. Image segmenting method according to claim 5, also comprising, in order to determine the critical points:
a computer system examining the points of the image,
for each point examined, called a point in progress:
a computer system determining whether the through-capacities for at least a predetermined number of windowed points of the point in progress:
are each greater than the predetermined positive capacity threshold, or
are each less than the predetermined negative capacity threshold,
by examining all of the windowed points in order to compare their through-capacity with the negative threshold and the positive threshold.

8. Image segmenting method according to claim 5, also comprising, in order to determine the critical points:
a computer system examining the points of the image,
for each point examined, called a point in progress:
a computer system determining whether the through-capacities for all of the windowed points of the point in progress:
are each greater than the predetermined positive capacity threshold, or
are each less than the predetermined negative capacity threshold, by using the determination obtained for a point examined before the point in progress.

9. A non-transitory computer-readable medium on which a computer program is recorded, characterized in that the computer program includes computer program instructions for implementing an image segmenting method according to claim 1 when said computer program is run by a computer.

10. Computer system comprising:
a device for reading a computer memory,
a device for writing in a computer memory,
characterized in that it comprises:
a computer memory in which a computer program is recorded, including computer program instructions for, when the computer program is run by the computer system:
reading, by means of the reading device, an image recorded in a computer memory, in which the image comprises a plurality of points, each including a position in the image,
assigning a capacity to each point, called a through-capacity,
determining points of the image, called critical points, for each of which, the points of the image located in a predetermined window applied around the critical point verify a predetermined condition on their through-capacities,
determining a solution to the problem of maximum flow in a graph comprising, on the one hand, as vertices, a source, a sink and determined image points, and, on the other hand, arcs each having a positive or zero flow passage capacity,
wherein the arcs include arcs called source arcs, linking the source to each of the points, arcs called sink arcs, linking the sink to each of the points, and arcs called inter-point arcs, linking the neighboring critical points to one another according to a predetermined neighboring criterion on their relative positions in the image,
wherein the through-capacities represent the combination of the flow passage capacities of the source ark and the sink arc respectively linking it to the source and to the sink,
assigning, on the basis of the determined solution, an "object" label or a "background" label to each of at least some of the points of the image,
recording, by means of the writing device, the image with the assigned labels in a computer memory.

11. Image segmenting method according to claim 2, wherein:
each point has an intensity,
the through-capacity of each of at least some of the points is determined on the basis of the intensity of this point, and
the flow passage capacity of each of at least some of the inter-point arcs is determined on the basis of the intensity of the two points that it links.

12. Image segmenting method according to claim 6, also comprising, in order to determine the critical points:
a computer system examining the points of the image,
for each point examined, called a point in progress:
a computer system determining whether the through-capacities for at least a predetermined number of windowed points of the point in progress:
are each greater than the predetermined positive capacity threshold, or
are each less than the predetermined negative capacity threshold,
by examining all of the windowed points in order to compare their through-capacity with the negative threshold and the positive threshold.

13. Image segmenting method according to claim 6, also comprising, in order to determine the critical points:
a computer system examining the points of the image, for each point examined, called a point in progress:
a computer system determining whether the through-capacities for all of the windowed points of the point in progress:
are each greater than the predetermined positive capacity threshold, or
are each less than the predetermined negative capacity threshold, by using the determination obtained for a point examined before the point in progress.

* * * * *